United States Patent [19]

Troitski et al.

[11] Patent Number: 6,087,617

[45] Date of Patent: *Jul. 11, 2000

[54] COMPUTER GRAPHICS SYSTEM FOR GENERATING AN IMAGE REPRODUCIBLE INSIDE OPTICALLY TRANSPARENT MATERIAL

[76] Inventors: Igor Nikolaevich Troitski; Alexander Georgievich Marounkov, both of 939 Santa Ynez, Henderson, Nev. 89015; Kenneth Wayne Walther, 3402 Ramsgate Ter., Alexandria, Va. 22309

[ * ] Notice: This patent issued on a continued prosecution application filed under 37 CFR 1.53(d), and is subject to the twenty year patent term provisions of 35 U.S.C. 154(a)(2).

[21] Appl. No.: 08/643,918

[22] Filed: May 7, 1996

[51] Int. Cl.[7] .................................................... B23K 26/00

[52] U.S. Cl. .................................. 219/121.6; 364/474.08; 382/141; 382/154

[58] Field of Search ........................... 219/121.6, 121.68, 219/121.69, 121.73, 121.75, 121.85; 358/451, 297, 299; 382/141, 154, 276, 298, 299; 364/474.08

[56] References Cited

U.S. PATENT DOCUMENTS

| | | |
|---|---|---|
| 3,657,085 | 4/1972 | Hoffmeister et al. . |
| 3,715,734 | 2/1973 | Fajans . |
| 3,778,361 | 12/1973 | Courtney-Pratt . |
| 4,092,518 | 5/1978 | Merad . |
| 4,174,154 | 11/1979 | Kawasaki . |
| 4,307,282 | 12/1981 | Gappa . |

(List continued on next page.)

FOREIGN PATENT DOCUMENTS

| | | |
|---|---|---|
| 624421 | 11/1994 | European Pat. Off. . |
| 237 972 A3 | 8/1986 | Germany . |
| 4407547 A1 | 9/1995 | Germany . |
| 63-144889 | 6/1988 | Japan . |
| 7-76167 | 3/1995 | Japan . |
| 321422 | 11/1971 | U.S.S.R. . |

OTHER PUBLICATIONS

H. Hack and N. Neuroth, "Internal Damage to Optical Glasses with 3 ns–Pulse Laser", Laser–Induced Damage in Optical Materials: 1980, Bennett, et al. (Editors), NBS Special Publication #620, Oct. 1981, pp. 102–109.

E.K. Maldutis, et al., "Accumulation and Laser Damage in Optical Glasses", Laser–Induced Damage in Optical Materials: 1981, NBS Special Publication #638, 1981, pp. 96–102.

J. Hecht, "Excimer Laser Update", Lasers & Applications, Dec. 1983, pp. 43–49.

"Handbook of Lasers with Selected Data on Optical Technology", R.J. Pressley (Editor), The Chemical Rubber Co., 1971, Preface.

R.F. Woodcock, "Commercial Laser Glasses", Handbook of Lasers with Selected Data on Optical Technology, The Chemical Rubber Co., 1971, p. 360.

N. Bloembergen, "Laser–Induced Electric Breakdown in Solids", IEEE Journal of Quantum Electronics, vol. QE–10, No. 3, Mar. 1974, pp. 375–386.

(List continued on next page.)

*Primary Examiner*—Gregory L. Mills
*Attorney, Agent, or Firm*—McDermott, Will & Emery

[57] ABSTRACT

A computer graphics system for generating an image reproducible in the interior of optically transparent material. An image reproducible inside optically transparent material is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the damage of the reproduced image due to the refraction of the optically transparent material, the coordinates of the generated etch points are adjusted to correct their positions along a selected laser beam direction.

4 Claims, 7 Drawing Sheets

U.S. PATENT DOCUMENTS

| | | |
|---|---|---|
| 4,309,998 | 1/1982 | Aron nee Rosa et al. . |
| 4,467,172 | 8/1984 | Ehrenwald et al. . |
| 4,480,169 | 10/1984 | Macken . |
| 4,532,402 | 7/1985 | Overbeck . |
| 4,538,608 | 9/1985 | L'Esperance, Jr. . |
| 4,744,647 | 5/1988 | Meshel et al. . |
| 4,843,207 | 6/1989 | Urbank et al. . |
| 4,847,181 | 7/1989 | Shimokawa ............................ 430/297 |
| 4,863,538 | 9/1989 | Deckard ................................ 156/62.2 |
| 4,914,270 | 4/1990 | Copley et al. ...................... 219/121.68 |
| 4,950,862 | 8/1990 | Kajikawa ............................. 219/121.7 |
| 5,206,496 | 4/1993 | Clement et al. . |
| 5,231,538 | 7/1993 | Anderson ................................ 359/462 |
| 5,575,936 | 11/1996 | Goldfarb ............................. 219/121.69 |
| 5,637,244 | 6/1997 | Erokhin .............................. 219/121.69 |

OTHER PUBLICATIONS

"Lasers in Materials Processing", E.A. Metzbower (Editor), American Society for Metals, May 1983, pp. 48–52, 54–62.

C.L. Hallmark, "Lasers, The Light Fantastic", Tab Books Inc., 1979, 7–8, 251, 260–261.

L. Goldman, "Applications of the Laser", CRC Press, 1973, pp. 49, 71–72, 209–223.

W. Koechner, "Solid–State Laser Engineering", Springer–Verlag, 1976.

Keates, et al., "Ophthalmic Neodymium YAG Lasers", Slack Inc., 1983.

S. Anisimov and V. Khokhlov, "Instabilities in Laser–Matter Interaction", CRC Press, 1995, Chapter 2.

C.R. Giuliano, "Laser–Induced Damage to Transparent Dialectric Materials", Applied Physics Letters, vol. V, No. 7, Oct. 1, 1964, pp. 137–139.

R.Y. Chiao, et al. "Stimulated Brillouin Scattering and Coherent Generation of Intense Hypersonic Waves", Physical Review Letters, vol. 12, No. 21, May 25, 1964, pp. 592–595.

D.W. Harper, "Laser Damage in Glasses", British Journal of Applied Physics, 1965, vol. 16, pp. 751–752.

D. Maydan, "Micromachining and Image Recording on Thin Films by Laser Beams", The Bell System Technica l Journal, vol. 50, No. 6, Jul./Aug. 1971, pp. 1761–1762.

"Lasers in Industry", S.S. Charschan (Editor), Van Nostrand Reinhold Company, 1972, pp. vii.

"Proceedings of the Japan–U.S. Seminar on Laser Interaction with Matter", C. Yamanaka (Editor), Japan Society for the Promotion of Science, Sep. 24–29, 1972, pp. 119–129, 136–138, 153–159.

A. Glass and A.H. Guenther, "Laser–Induced Damage of Optical Elements—a Status Report", Applied Optics, vol. 12, No. 4, Apr. 1973, pp. 637–640.

D. Fradin and M. Bass, "Electron Avalanche Breakdown Induced by Ruby Laser Light", Applied Physics Letters, vol. 22, No. 5, Mar. 1, 73, pp. 206–208.

D.W. Fradin, et al., "Confirmation of an Electron Avalanche Causing Laser–induced Bulk Damage at $106\mu m$", Applied Optics, vol.12, No. 4, Apr. 1973, pp. 700–709.

N. Bloembergen, "Laser–Induced Electric Breakdown in Solids", IEEE Journal of Ouantum Electronics, vol. OE–10, No. 3, Mar. 1974, pp. 375–386.

M.J. Weiner, "Product Marking with ND:YAG and $CO_2$ Lasers", Proceedings of the Society of Photo–Optical Instrumentation Engineers, vol. 86, pp. iii, 23–29, 1976.

D.H. Auston, "Picosecond Nonlinear Optics", UltraShort Light Pulses: Picosecond Techniques and Applications, Springer–Verlag, 1977, pp. 177–180.

J. Wasko, "Nd: YAG or $CO_2$?", Electro–Optical Systems Design, Sep. 1977, pp. 52–56.

B. Bernard, "Programmable Laser Marking System", Laser 79 Opto–Electronics, 1979, pp. 235–239.

"The Laser Guidebook", Jeff Hecht (Editor), McGraw–Hill Book Co., 1986, pp. ix, 293.

Ready, J., "Effects of High–Power Laser Radiation", 1971, pp. 277–316.

"Laser Microfabrication: Thin Film Processes and Lithography"; Daniel J. Ehrlich, James Y. Tsao (Editors), Academic Press, Inc. 1989, pp. v–viii;45–50–231–283.

S. Gibilisco, "Understanding Lasers", Tab Books, Inc. 1989, pp. iii–iv, 93–119.

R.E. Iannini, "Build Your Own Working Fiberoptic Infrared and Laser Space–Age Projets", Tab Books Inc., 1987, pp. 183–214.

J.F. Ready, "Effects of Laser Radiation", Industrial Research—Aug. 1965, pp. 44–50.

J.F. Ready, "Industrial Applications of Lasers", Academic Press 1978, pp. vii–xi,98–99, 145–161, 164–166, 217–222, 335–341, 344–357, 419–427.

J.F. Ready, "Industrial Applications of Lasers: Second Edition", Academic Press 1997, pp. vii–xiii, 170–175, 192–215, 314–335, 410–415.

"Laser Induced Damage In Optical Materials: 1972", A. J. Glass, Arthur H. Guenther (Editors), National Bureau of Standards (U.S. Dept. of Commerce)—Oct. 1972, pp. iii–xv, 1–197.

"Damage In Laser Materials: 1972", A. J. Glass, Arthur H. Guenther (Editors), National Bureau of Standards (U.S. Dept. of Commerce)—Dec. 1970, pp. iii–viii. 1–119.

P.D. Maker, et al., "Optical Third Harmonic Generation", Scientific Laboratory, Ford Motor Company, 1963, pp. 1565–1570.

A. Siegman, "Lasers", University Science Books, 1986, pp. 1004–1005, 1021, 1028–1029, 1032–1033, 1039–1040, 1056, 1061.

"Laser Makes Fast, No–Damage Etches", Engineering News, Feb. 12, 1990, p. 35.

Daniel Winkler, "Status Quo Beim Laserbeschriften", Technica, Feb. 1988, pp. 54–56.

B. Mullins and B. Richert, "Strehl Ratio Measurements of Laser Damaged Plastics", U.S. Air Force Academy, Special Publication #688, Nov. 1985, pp. 80–83.

R.M. O'Connell, et al., "Laser Damage in Plastics at the Frank J. Seiler Research Laboratory", NBS Special Publication #688, U.S. Air Force Academy, Physics Dept., Nov. 1985, pp. 59–69.

Dyumaev, et al., "Transparent Polymers: A New Class of Optical Materials for Lasers", Soviet Journal of Ouantum Electronics, 13(4) Apr. 1983, pp. 503–507.

I.V. Aleshin, et al., "Optical Breakdown of Glass by a Sharply Focused Laser Beam", Soviet Technical Letters 4(7), Jul. 1978, pp. 348–349.

A.A. Manenkov, et al., "Nature of the Cumulative Effect in Laser Damage to Optical Materials", Soviet Journal of Ouantum Electronics, 13(12) Dec. 1983, pp. 1580–1583.

M.I. Aldoshin, et al., "Laser Damage in Transparent Polymers of Various Atomic Compositions", Soviet Technical Letters 49(11), Nov. 1979, pp. 1411–1412.

A.A. Manenkov, et al., "Analysis of a Mechanism of Laser Damage to Transparent Polymers Associated with their Viscoelastic Properties", Soviet Journal of Ouantum Electronics, 11(4), Apr. 1981, pp. 502–505.

I.I. Ashmarin, et al., "Dynamic Characteristics of Laser Damage in Glass", Sov. Phys. Tech. Phys. vol. 18, No. 11, May 1974, pp. 1513–1515.

V.A. Gridin, et al., "Characteristics of the Damage of Transparent Solids by Ultrashort Laser Pulses", Soviet Journal of Ouantum Electronics, vol. 4, No. 10, Apr. 1975, pp. 1270–1271.

S.T. Parinov and V.M. Russov, "Anisotropic Optical Damage to Glass", Sov. Phys. Tech. Phys. 32(11), Nov. 1987, pp. 1348–1349.

Aleshkevich, et al., "Frequency Characteristics in Optical Breakdown of Transparent Solid Dielectrics by Nanosecond Laser Pulses", Sov. Phys. Tech. Phys. vol. 21, No. 8, Aug. 1976, pp. 975–978.

Manenkov, et al., "Laser Damage to Transparent Polymers in Sharply Focused Single–Mode Beams", Bulletin of The Academy of Sciences of the USSR. Physical Series, Allerton Press Inc., 1980, vol. 44, No. 8, pp. 173–175.

Manenkov, et al., "Accumulation Effect in the Laser Destruction of Optical Materials", Bulletin of The Academy of Sciences of the USSR, Physical Series, Allerton Press Inc., 1980, vol. 52, No. 9, pp. 121–128.

A.A. Orlov and P.I. Ulyakov, "The Development of Volumetric Failure in Silicate Glasses and Polymers Under the Action of Laser Radiation", Journal of Applied Mechanics and Tehcnical Physics, vol. 13, No. 4, Jul.–Aug. 1972, pp. 551–556.

N. Bloembergen, "Laser–Induced Electric Breakdown in Solids", IEEE Journal of Quantum Electronics, vol. QE–10, No. 3, Mar. 1974, pp. 375–386.

D. Edwards and C.Y. She, "Laser Produced Damage in Transparent Solids", Air Force Cambridge Research Laboratories, Air Force Systems Command, USAF, Feb. 1972, pp. i–iv, 1–32.

D.W. Fradin, "Laser–Induced Damage in Solids", Laser Focus, vol. 10, No. 2, Feb. 1974, pp. 3, 39–40, 42, 44–45.

A.A. Manenkov, "On the Nature of Accumulation Effect in the Laser–Induced Damage to Optical Materials", Laser Induced Damage in Optical Materials: 1982, NBS Special Publication #669, 1982, pp. 436–447.

F. Tuma, "Beschriften mit Laserstrahlen", Feinwerktechnik & Messtechnik 96, Jul.–Aug. 1988, pp. 308–310.

C. Thomas, "Firm Offers Clear View of Toilets, Gift Items", Wichita Business Journal, vol. 2, No. 46, Jan. 25, 1988, pp. 1, 26.

C. Yamanaka, et al., "Investigation of Damage in Laser Glass", Damage in Laser Materials: 1971, NBS Special Publication #356, 1971, pp. 104–112.

"Laser–Induced Damage in Optical Materials: 1980", Bennett, et al. (Editors), NBS Special Publication #620, Oct. 1981, pp. iii–xii.

Serway, R.A., Physics for Scientists and Engineers, Second Edition, Saunders College Publishing, Philadelphia, 1986, pp. 802, 803, 825–828.

COMPUTER GRAPHICS SYSTEM FOR GENERATING AN IMAGE REPRODUCIBLE INSIDE OPTICALLY TRANSPARENT MATERIAL

TECHNICAL FIELD

The present invention relates to reproducing an image inside a transparent object, and more particularly, to a computer graphics system for generating the image to be reproduced.

BACKGROUND ART

A number of techniques for creating a variety of patterns on the surface and inside of transparent substrates using pulsed laser radiation are well known.

For example, U.S. Pat. No. 4,092,518 to Merard, discloses a method for decorating transparent plastic articles. This technique is carried out by directing a pulsed, laser beam into the body of an article by successively focusing the laser beam in different regions within the body of the article. The pulse energy and duration is selected based upon the desired extent of the resulting decorative pattern. The effect of the laser is a number of three-dimensional "macro-destructions" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different sizes arranged randomly around the focal point of the optical system guiding a laser beam. The device used to carry out this technique is preferably a multi-mode solid-state, free-running pulsed laser used in conjunction with a convergent lens having a focal length from 100 to 200 mm. Optimally, the cylindrical articles of transparent material have a diameter of 35 to 80 mm, and a length of 85 to 205 mm. No means for controlling the laser beam is provided.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 $\mu$m acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed. The laser beam is controlled by a microcomputer or an optical pick-up device that transforms an image of decorations on a sample into a control electrical signal. However, no means for graphics processing to generate an image to be created is disclosed.

Interior laser etching of a transparent article is accomplished as described in European Patent Application No. 624421A2 to Erokhin (priority based upon U.S. patent application Ser. No. 08/110,048 and Russian Patent Application No. 29023). The technique disclosed depends upon a particular optical system including a diffraction-limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, operation of the focusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material.

However, no characteristics of the transparent material are taken into consideration. The distance between picture elements is selected with no consideration for the material strength. Therefore, the article may be damaged if the picture elements are too close to each other.

Accordingly, it would be desirable to provide a computer graphics system that would allow an image reproducible inside optically transparent material to be generated based on the transparent material characteristics.

Further, in order to increase the effectiveness of laser etching, the number of etch points inside the optically transparent material should be reduced. However, the image resolution may be unacceptably low, if the picture elements are too far from each other. Therefore, it would be desirable to provide a computer graphics system that would allow the number of etch points to be reduced so as to maintain the high quality of an image defined by the etch points.

DISCLOSURE OF THE INVENTION

Accordingly, one advantage of the invention is in providing a computer graphics system that enables an operator to generate an image that can be reproduced inside optically transparent material using the minimum number of etch points required to provide a high-quality reproduction of the generated image.

Another advantage of the invention is in providing a computer graphics system that allows an image to be generated so as to prevent its reproduction in the interior of optically transparent material from being damaged.

The above and other advantages of the invention are achieved, at least in part, by providing a computer-implemented method of generating an image reproducible inside an optically transparent article. In accordance with the invention, a first image supplied to a data processing unit is represented by a first plurality of etch points, in which breakdowns in the optically transparent article are to be provided. The number of the etch points in the first plurality of etch points is reduced so as to maintain a high-quality image. Based on the optical characteristics of the optically transparent article, the first image is transformed into a second image represented by a second plurality of etch points displaced with respect to the first plurality of etch points. The second image is to be reproduced in the optically transparent article to create an appearance of the first image.

In accordance with a preferred embodiment of the present invention, the first and second plurality of etch points respectively define three-dimensional representations of the first and second images.

In accordance with a first aspect of the invention, the data processing unit is supplied with a value of the minimum distance, at which the etch points in the optically transparent article may be formed without damaging the article. The first image is defined by the etch points located at the minimum distance from each other.

In accordance with another aspect of the invention, the density of the etch points is reduced so as to maintain predetermined relations between brightness of various fragments of the first image.

In accordance with a further aspect of the invention, an optimum number of the etch points required to define the first image is determined based on the sizes of the etch points.

Preferably, a direction of a laser beam for creating the etch points is selected. The etch points in the second plurality of etch points are displaced along the direction of the laser beam with respect to the etch points in the first plurality of etch points to prevent an image inside the optically transparent article from being distorted.

A system for generating an image reproducible inside an optically transparent article comprises means for supplying a first image, and an image processing unit responsive to the supplying means for defining the first image by a first plurality of etch points, and for transforming the first image into a second image based on optical characteristics of the optically transparent article. The second image is defined by a second plurality of etch points displaced with respect to the first plurality of etch points so as to represent an appearance of the first image in the optically transparent article.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Although the invention has general applicability in the field of computer graphics, the best mode for practicing invention is based in part on realization of a computer system for generating an image to be reproduced in the interior of optically transparent material.

Figure 1:
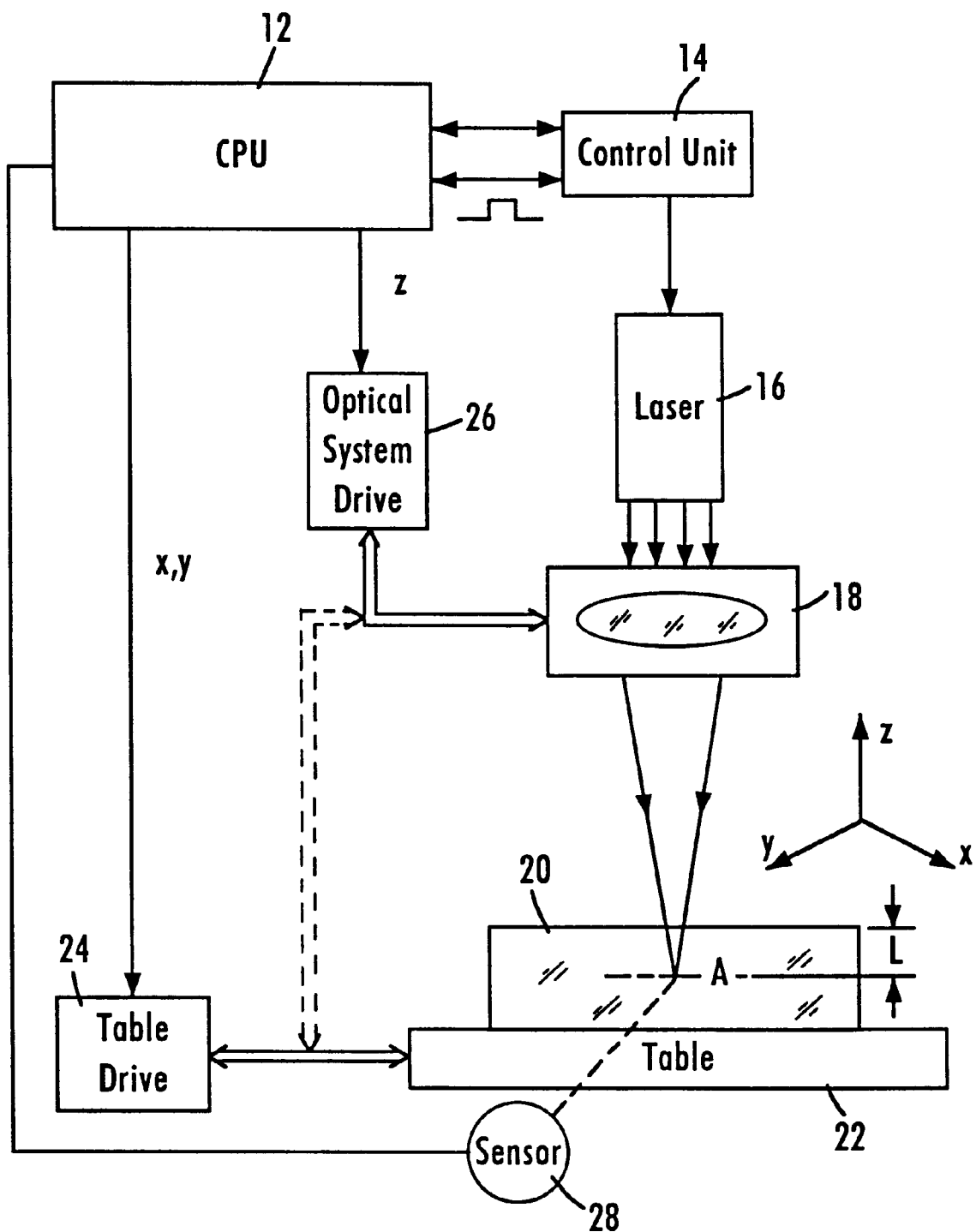
FIG. 1 is an exemplary block-diagram of a laser etching system that may reproduce an image generated by the system of the present invention.

Reference is now made to FIG. 1 showing an exemplary block-diagram of a system for reproducing an image in the interior of optically transparent material. The system is controlled by a central processing unit (CPU) 12, which may be a personal computer having a memory for storing image and control data. Via a control unit 14, the CPU 12 controls a laser 16 that generates a narrow, intense beam of infrared light. An optical system 18 focuses the laser beam into a selected etch point A inside an article 20 made of optically transparent material. As a result, a breakdown is produced in the region of the selected etch point inside the transparent material. The development of breakdowns in transparent materials is discussed for example, in "Effects of High-Power Laser Radiation" by John Ready, 1971, pp. 277–316. An image reproduced inside the transparent article 20 is defined by a plurality of etch points formed in accordance with image data supplied by the CPU 12.

The article 20 may be supported by a table 22. A table drive 24 that moves the table 22 along X, Y axes in a coordinate system shown in FIG. 1 may be used to position the etch points along the X, Y axes. The CPU 12 supplies the table drive 24 with control signals to provide positioning. An optical system drive 26 that moves the optical system 18 along the Z axis in accordance with control signals supplied by the CPU 12 may be used to position the etch points along the Z axis. A sensor 28 that detects light irradiated from the etch points may provide the CPU 12 with feedback information required to adjust a laser etching procedure. The system for reproducing an image is disclosed in more detail in copending application Ser. No. 03/570,383, entitled "A SYSTEM FOR REPRODUCING AN IMAGE IN THE INTERIOR OF OPTICALLY TRANSPARENT MATERIAL," filed Dec. 11, 1995 and incorporated herewith by reference.

As a result of the laser etching procedure, a three-dimensional (3D) image inside optically transparent material may be produced. This image may be created manually, or may be formed automatically in accordance with image data preprogrammed in the CPU 12. Various procedures may be used to supply the CPU 12 with the image data. For example, an image may be drawn manually on a screen of the CPU 12. Alternatively, the image data may be received from a communication channel, or read from a local memory.

The preprogrammed image data may represent a specific 3D object, a copy of which is to be reproduced inside the optically transparent article 20. The image data of the 3D object may be supplied to the CPU 12 using a video camera, a scanner, or any other photoelectric or magnetic device that converts a 3D image into corresponding electric signal for processing by the CPU 12.

Figure 2:
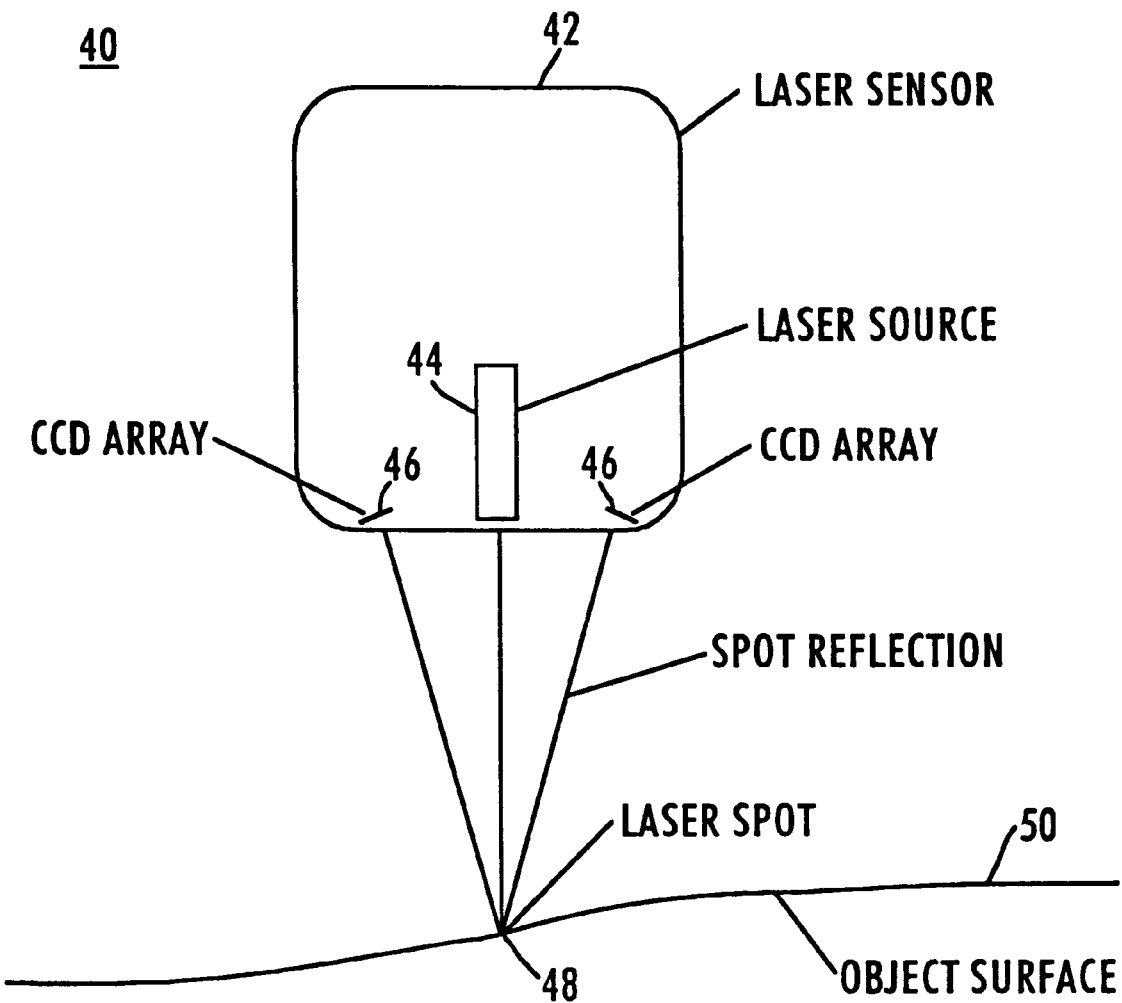
FIG. 2 is a diagram of a laser digitizing system for supplying a computer graphics system with image data.

For example, FIG. 2 shows a laser digitizing system 40 manufactured by Laser Design, Inc., that provides laser digitizing of 3D objects. The system 40 comprises a laser sensor 42 having a laser source 44 and a two-dimensional Charged Coupled Device (CCD) array 46. The laser source 44 is a low power diode laser that emits a laser beam to form a laser spot 48E on a surface 50 of a 3D object. The CCD array 46 views the laser spot to determine location of its center with respect to the array. The laser sensor 42 mounted to a computer-controlled positioning system (not shown) is driven to scan the object surface 50. The position of the laser spot 48 determined by the CCD array 46 is used to compute X, Y and Z coordinates of points on the object surface 50 illuminated by the scanning laser spot 48. The scan density and pattern parameters that define a distance between adjacent points are set by a user. The XYZ coordinates of the scanned points are stored in a file that may be supplied directly into a computer that runs DataSculpt® data processing software developed by Laser Design, Inc. Alternatively, the stored XYZ coordinates may be converted into a format suitable for a computer graphics system used for image data processing.

In a computer graphics system of the present invention, a 3D object to be reproduced inside optically transparent articles is defined by a plurality of points on its surfaces.

Each point is represented by its X, Y, and Z coordinates, and by a brightness bit that defines the brightness of the pixel corresponding to the point. For example, "1" may define a light pixel of the resulting image data, whereas "0" may define a dark pixel of the resulting image data.

The image of the 3D object to be reproduced may be supplied into an image processing computer using any of the above-discussed procedures. The CPU 12 that controls the laser etching procedure may be used as the image processing computer. Alternatively, any workstation or personal computer that runs an image processing program, for example, DataSculpt® data processing software developed by Laser Design, Inc., may support a 3D image data analysis, editing and manipulation provided in the computer graphics system to generate an image. For example, Macintosh and IBM-compatible personal computers, Silicon Graphics, Sun Microsystems or Hewlett Packard workstations may be used. The image generation procedure may be controlled by an operator.

Figure 3A:
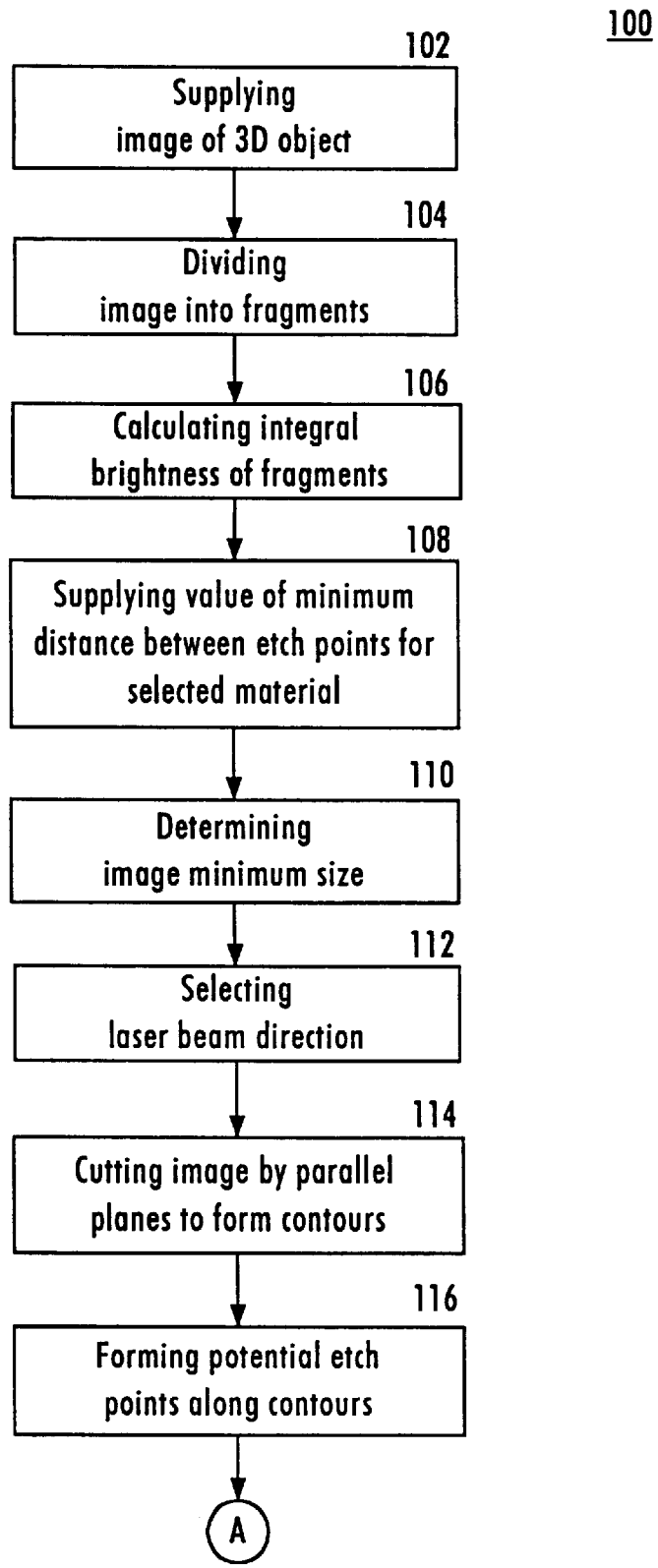
FIGS. 3A–3B show a flow chart of a potential etch point generation routine.
Figure 3B:
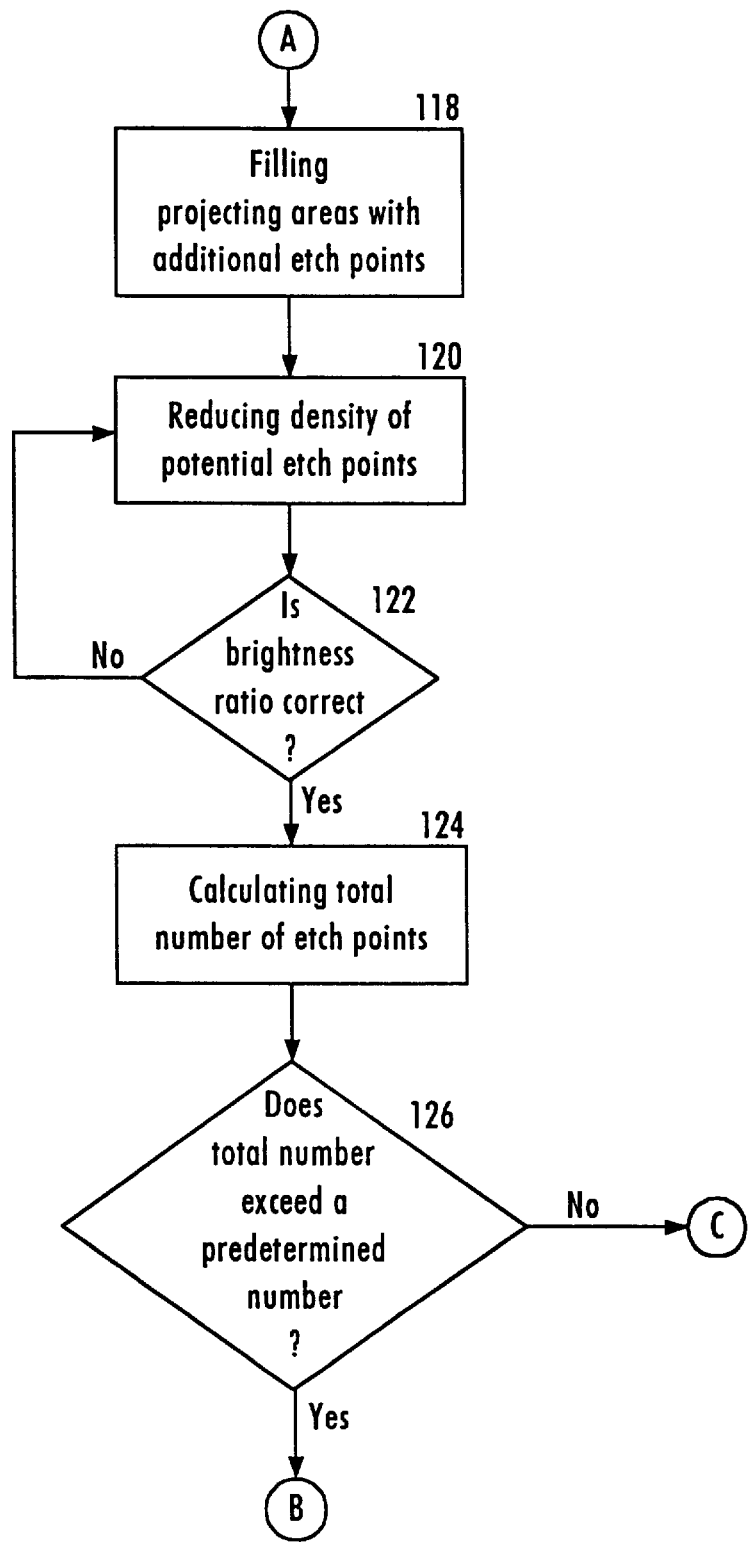

Reference is now made to FIG. 3 showing a potential etch point generation routine 100 that allows an image reproducible inside optically transparent material to be defined by potential etch points, in which breakdowns required to create the image are possible. After X, Y and Z coordinates and brightness bits that represent points on surfaces of a 3D object to be reproduced in the optically transparent material are supplied to the image processing computer (step 102), the resulting image displayed on the screen of the computer is divided into small fragments having a predetermined shape (step 104). For example, rectangular fragments may be formed. Each fragment represents a portion of the displayed 3D image surrounded by the fragment sides.

For each fragment n, the value of its integral brightness $J_n$ is calculated in step 106. This value is defined as the ratio of the number of light pixels in a fragment to the area of this fragment. As discussed above, the light pixels may correspond to the points of the object with the brightness bit equal to "1". The calculated integral brightness $J_n$ of each fragment is recorded into a table of fragments, wherein fragments are defined by their numbers 1, 2, . . . , n−1, n, n+1, . . . , N, and by their values of the integral brightness $J_1$, $J_2$, . . . , $J_{n-1}$, $J_n$, $J_{n+1}$ . . . , $J_N$. The numbers of fragments in the table are arranged in the order of their integral brightness $J_n$, so that $J_{n+1} \geq J_n \geq J_{n-1}$. Accordingly, the value $J_N$ corresponds to the fragment having the largest integral brightness. The table of fragments is written into a memory of the image processing computer.

In step 108, the image processing computer is supplied with the value $d_0$ of the minimum distance between adjacent etch points in optically transparent material. This value also defines the minimum distance between an etch point and an external surface of an optically transparent article. The value $d_0$ is determined experimentally for a selected type of optically transparent material as the minimum distance between etch points having the minimum size that can be provided without the breakage of the material. The etch points having the minimum size are defined as etch points formed using the minimum laser energy that can produce a breakdown in the optically transparent material of the selected type. For example, for glass, the value $d_0$ is equal to 200–300 μm.

In step 110, the minimum size of the image formed inside the selected optically transparent material is determined. It was established experimentally that 10 points for each linear dimension of a fragment are sufficient to adequately reproduce the shape of the fragment. Accordingly, the minimum image size achievable inside the selected optically transparent material may be determined from the following equation:

$$L_{im}=10d_0 L_{obj}/L_{fr}, \qquad (1)$$

where $L_{im}$ is the minimum linear dimension of the image to be formed, along the X, Y or Z axis of the coordinate system shown in FIG. 1, and $L_{obj}$ and $L_{fr}$ are the linear dimension of the real 3D object to be reproduced, and the linear dimension of the minimum fragment, respectively, along the corresponding axis.

Then, on the 3D image displayed on the screen, a direction along the Z axis is selected (step 112). As shown in FIG. 1, this direction coincides with the direction of a laser beam generated during the laser etching procedure. If the image is symmetrical with respect to a plane of symmetry, it is convenient to select the Z axis direction along the plane of symmetry. If the image is symmetrical with respect to an axis of symmetry, the selected direction may be perpendicular to the axis of symmetry.

Along the selected direction, a plurality of parallel planes cutting the entire displayed image is formed (step 114). The planes are perpendicular to the selected direction and parallel with respect to the surface of the optically transparent article. Image processing programs for cutting a 3D image by multiple parallel planes are well known in the art. For example, the DataSculpt® data processing software system may be used. A distance between the parallel planes is set equal to $d_0$. For the minimum linear dimension along the Z axis $L_{imz}$, the parallel planes will produce $M=L_{imz}/d_0$ sections of the displayed image. Each of the sections have the two-dimensional contour of the displayed image. The contours are defined with their serial numbers 1, 2, . . . , m, . . . , M, corresponding to the numbers of the planes, on which the contours are formed, where M is the number of the contour formed on the plane closest to the laser beam source.

As a result, any fragment n of the 3D image cut by several planes is divided into several two-dimensional subfragments $n_m$ having the integral brightness $J_{nm}$, where m is the serial number of the contour representing subfragment $n_m$ of fragment n. The integral brightness $J_n$ of fragment n is equal to the sum of the integral brightness values of all two-dimensional subfragments $n_m$ in the fragment n:

$$J_n=\Sigma_m J_{nm}, \qquad (2)$$

where $J_{nm}$ is the integral brightness of subfragment $n_m$ in fragment n.

In step 116, along each contour m, a plurality of potential etch points is selected at the distance $d_0$ from each other, so as to cover the entire contour. The potential etch points define points in the interior of the optically transparent material where the breakdowns required to create a predetermined image are possible. If contour m is closed, the last potential etch point on the contour formed at a distance less than $d_0$ from the first potential etch point on the same contour, is deleted. As a result, $p_m$ potential etch points are formed along each contour m.

In step 118, each closed contour m is analyzed to determine whether it surrounds a peripheral area that projects beyond an area surrounded by the next contour m−1. Each projecting peripheral area that has a dimension more than $2d_0$, is filled with additional potential etch points formed at the distance $d_0$ from each other and from the potential etch points along the contour m. The internal area surrounded by contour 1 located in the plane closest to a viewer, is completely filled with additional potential etch points formed at the distance $d_0$ from each other and from the potential etch points along the contour 1.

The potential etch points formed in steps 116 and 118 correspond to the maximum number of etch points for representing a selected 3D object by an image of a predetermined size created in optically transparent material. However, in the image represented by the maximum number of etch points, the relations between the integral brightness $J_n$ of its various fragments is distorted. To adjust these relations, the $J_n$ values stored in the table of brightness are used.

In step 120, the number of potential etch points in each subfragment $n_m$ of each fragment n is reduced by a preset amount so as to maintain the uniform distribution of the potential etch points across the area of the subfragment. In step 122, the system checks whether the following condition is satisfied:

$$J'_n/J'_N = J_n/J_N, \quad (3)$$

where $J_n$ is the integral brightness of a fragment n stored in the table of brightness, $J_N$ is the integral brightness of the fragment having the largest integral brightness stored in the table of brightness, $J'_n$ is the integral brightness of a fragment n calculated after the reduction of potential etch points in the previous step, $J'_N$ is the integral brightness of the fragment having the largest integral brightness after the reduction of potential etch points in the previous step.

If the condition (3) is not. satisfied for each fragment n in the image, the system repeats step 120. This procedure is carried out until the condition (3) is satisfied for each fragment n.

Then, the total number of potential etch points in all fragments is calculated (step 124). In step 126, the resulting total number is compared with a predetermined number $N_0$ that depends on the efficiency of a laser etching system. If the total number of potential etch points exceeds the number $N_0$, an optimization routine 200 is carried out. If the resulting total number does not exceed the number $N_0$, the system goes to an adjustment routine 300.

Figure 4:
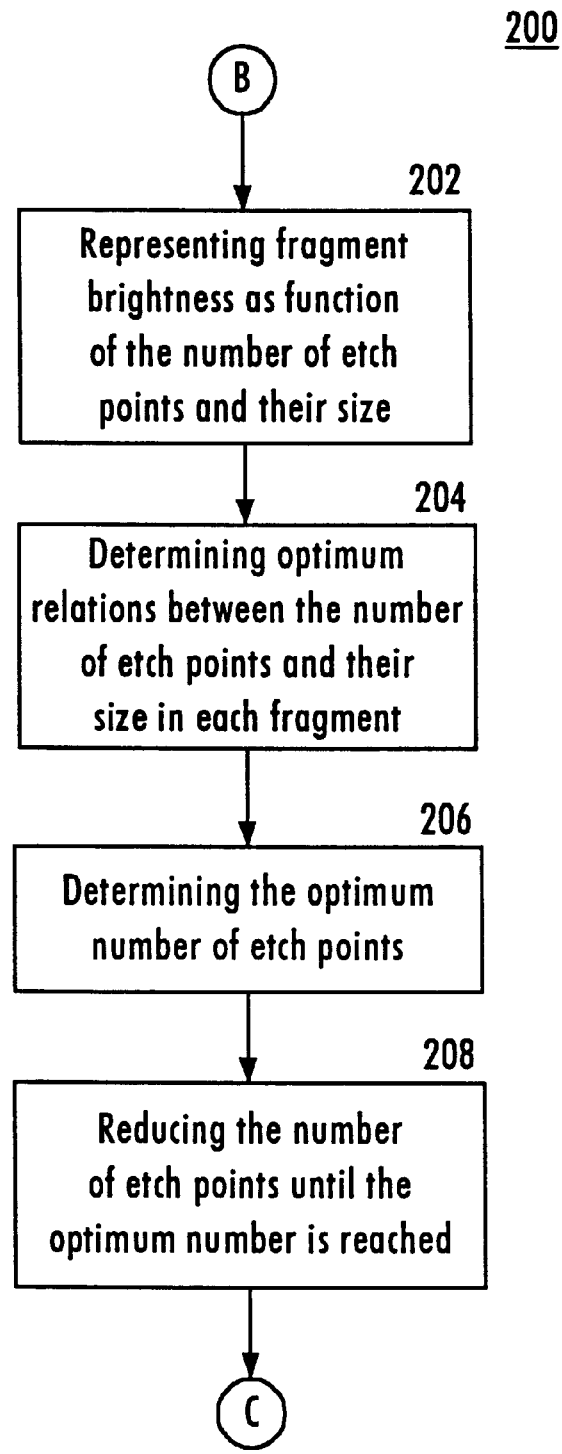
FIG. 4 is a flow chart of an optimization routine.

Reference is now made to FIG. 4, showing the optimization routine 200 that allows the number of potential etch points to be reduced based on their size.

For each small etch point (with the diameter less than 1 mm), it is determined that the intensity of the light reflected from the etch point towards a viewing direction is proportional to the area $\Omega$ of the etch point projection onto a plane surface perpendicular to the viewing direction. Accordingly, in step 202, the integral brightness $J_n$ of each 3D fragment n is represented as a function of the number of etch points and their size. In particular, $J_n$ is represented as the sum of the brightness values of each potential etch point in subfragment $n_m$ of the fragment n. As the etch points in a fragment have the same size less than 1 mm, $$J_n = K S_n^{-1} Q_n \Omega_n, \quad (4)$$

where $S_n$ is the area of fragment n,

K is a coefficient determined experimentally, $\Omega_n$ is the total area of etch point projections in fragment n, equal to the sum of the areas $\Omega$ in fragment n, $Q_n$ is the total number of etch points in fragment n.

In step 204, optimum relations between the number of the etch points in fragment n and their size are determined.

Using expression (4), to maintain predetermined brightness relations between fragments discussed above, the following condition should be satisfied:

$$J_n/J_{n-1} = S_{n-1} Q_n \Omega_n / S_n Q_{n-1} \Omega_{n-1}, \quad (5)$$

where $J_n$ and $J_{n-1}$ are the integral brightness values for fragments n and n−1 stored in the brightness table ($n \geq 2$).

Parameter $V_n = Q_n \Omega_n$ defines an inverse relationship between the total area of etch point projections in any fragment and the total number of etch points in this fragment. Equation (5) can be rewritten as:

$$J_n/J_{n-1} = S_{n-1} V_n / S_n V_{n-1}. \quad (6)$$

As discussed above, the total number of etch points in an image inside optically transparent material should not exceed the predetermined number $N_0$. Accordingly, another condition for selecting the optimum relations between the number of etch points and their size is:

$$N_0 = \Sigma_n Q_n, \quad (7)$$

where $\Sigma_n Q_n$ is the total number of etch points in all fragments of the image.

A system of equations (6) and (7) is solved to calculate optimum parameters $V_1, \ldots, V_n, \ldots, V_N$ for each fragment from 1 to N recorded in the brightness table.

In step 206, the optimum number of etch points in each fragment of the image is calculated based on the determined parameter $V_n$ for this fragment:

$$Q_{nopt} = V_n / \Omega_{nmin}, \quad (8)$$

where $Q_{nopt}$ is the optimum number of etch points in fragment n, $\Omega_{nmin}$ is the total area of etch point projections in fragment n, calculated for the minimum size of etch points possible for a selected type of optically transparent material.

As discussed above, the etch points of minimum size are defined as etch points that can be created using the minimum laser energy sufficient to produce a breakdown in the optically transparent material of the selected type. For spherical etch points, the area of each etch point projection is equal to: $\Omega = \pi D^2/4$, where D is the diameter of an etch point.

In step 208, the number of potential etch points formed in each fragment is compared with the optimum number $\Omega_{nopt}$ calculated for this fragment. If the number of potential etch points in a fragment exceeds $\Omega_{nopt}$, this number is reduced until the number $\Omega_{nopt}$ is reached. The reduction procedure is carried out so as to maintain the uniform distribution of the etch points across the fragment area. As discussed above, it was established experimentally that at least 10 points for each linear dimension of a fragment are required to adequately reproduce the shape of the fragment. Therefore, if for any fragment, $\Omega_{nopt} < 10^2$, the number of potential etch points in this fragment is reduced until 100 etch points remain. When the optimum number of the etch points is reached in each fragment, the system goes to the adjustment routine 300.

Figure 5:
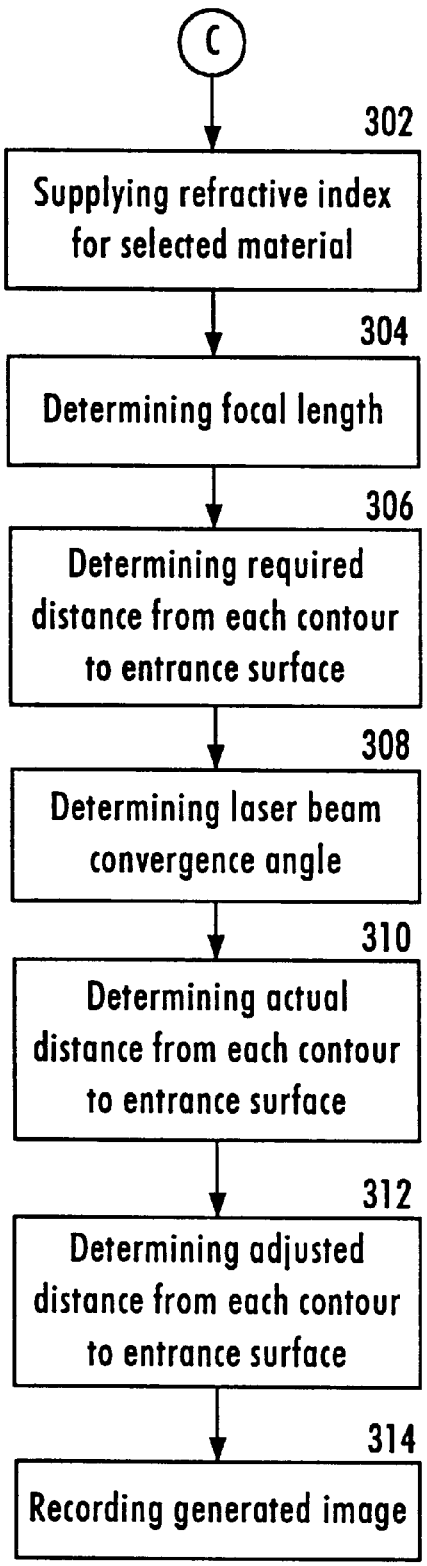
FIG. 5 is a flow chart of an adjustment routine.
Figure 6:
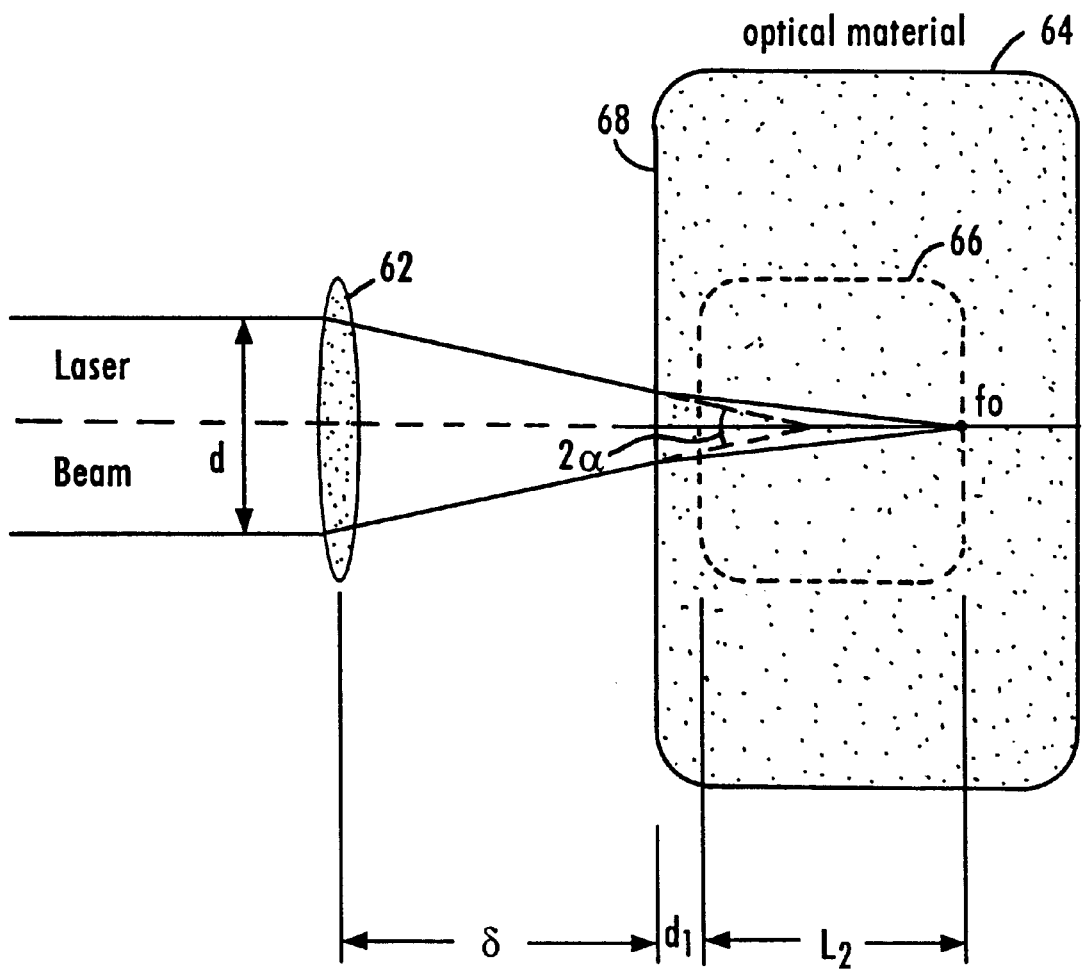
FIG. 6 is a simplified diagram of a laser beam focusing system that illustrates operations of the adjustment routine.

Referring to FIG. 5, the adjustment routine 300 is carried out to modify coordinates of the remaining etch points taking into account the characteristics of specific optically transparent material, inside which an image is to be created. In particular, in addition to the value $d_0$ that defines the minimum distance between etch points in selected optically transparent material, the refractivity index $n_r$ of the selected material is written into a system memory. In step 302, the $n_r$ value is read from the memory to determine a required focal length f of a lens in a an optical system that focuses a laser beam to create an image inside the transparent material. For a thin lens, a focal length f is approximately the distance from the lens to the focal point of the lens. FIG. 6 shows a simplified diagram that illustrates a lens 62 that focuses a laser beam into an optically transparent article 64 to create an image 66 inside the article.

In step 304, the required focal length f is determined from the following expression:

$$L_z = (f - \delta) n_r - d_1, \quad (9)$$

where $\delta$ is the minimum distance from the lens 62 to the article 64 that allows the optical system and the article to be displaced with respect to each other, $L_z$ is the size of the image 66 along the direction of a laser beam selected in step 112 (that coincides with the direction along Z axis in the coordinate system shown in FIG. 1), $d_1$ is the distance from the entrance surface 68 of the article 64, through which a laser beam penetrates the article, to an etch point on the contour M closest to this surface.

To prevent the article 64 from being broken $$d_1 \geq d_0. \quad (10)$$

In step 306, the distance $h_m$ along Z axis from each contour m to the entrance surface 68 of the article 64 is determined as follows:

$$h_m = d_1 + (M - m) d_0, \quad (11)$$

where M is the serial number of the contour closest to the entrance surface. The values $h_m$ are calculated without taking into consideration the beam refraction in the optically transparent material.

In step 308, the beam convergence angle $2\alpha$, is determined as follows:

$$\alpha = \operatorname{arctg}(d/2f), \quad (12)$$

where d is the diameter of a laser beam before it falls on the lens surface.

In step 310, the actual distance $h'_m$ along Z axis from each contour m to the entrance surface 68 resulted from beam refraction on the entrance surface is determined as follows:

$$h'_m = h_m (n_r^2 - \sin^2\alpha)^{1/2} / \cos\alpha \quad (13)$$

Accordingly, in order to provide the accurate reproduction of a real 3D object inside the article 64, etch points on any contour m should be positioned at the depth $h_m$. However, due to the refraction of a laser beam, the etch points on the contour m will be actually located at the depth $h'_m$ extended along Z axis with respect to the depth $h_m$. As a result, the image created inside the article 64 would be distorted. To avoid image distortion, the calculated depth $h_m$ of each contour m should be adjusted to correct the depth extension along Z axis.

In step 312, the depth $h_m$ is adjusted by a correction value inversely proportional to an extension coefficient $k_e = h'_m / h_m$. An adjusted distance $H_m$ along Z axis from any contour m to the entrance surface is calculated as follows:

$$H_m = h_m (1/k_e) = h_m \cos\alpha / n_r (1 - \sin^2\alpha)^{1/2}. \quad (14)$$

In step 314, the values $H_m$ are written into the system memory to define the depth, at which each contour m in the image should be positioned during a laser etching procedure. These values correspond to Z coordinates of etch points positioned on each contour m in the coordinate system shown in FIG. 1. The X, Y coordinates of the etch points that remain after density reduction procedures in the routines 100 and 200, together with Z coordinates of these points modified in accordance with the values $H_m$, are recorded into the system memory to define the generated image. It is to be understood that the present invention is not limited by the contour representation of an image, and is capable of modification in various obvious respects to cover various methods of image digitizing well known to one skilled in the art of the computer graphics.

Thus, a computer graphics system of the present invention generates an image reproducible in the interior of optically transparent material. The generated image is defined by selected etch points, coordinates of which are written in the system memory. For example, X, Y coordinates of the computer-generated etch points may be used in the laser etching system shown in FIG. 1 to position the table drive 24, whereas Z coordinates may be used to control the optical system drive 26. As a result, actual etch points corresponding to the computer-generated etch points are produced inside optically transparent material to represent. a reproduced image.

There accordingly has been described a computer graphics system for generating an image reproducible in the interior of optically transparent material. An image reproducible inside optically transparent material is defined by potential etch points, in which the breakdowns required to create the image in selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to e-he refraction of the optically transparent material, the coordinates of the generated etch points are adjusted to correct their positions along a selected laser beam direction.

Accordingly, the computer graphics system of the present invention enables an operator to generate an image that can be reproduced inside optically transparent material using the minimum number of etch points required to provide the high-quality reproduction of the generated image. Therefore, the system reduces the time required for creating the image reproduction during a laser etching procedure.

Further, the computer graphics system of the present invention allows an image to be generated so as to prevent its reproduction in the interior of optically transparent material from being distorted.

In this disclosure, there are shown and described only the preferred embodiments of the invention, but it is to be understood that the invention is capable of changes and modifications within the scope of the inventive concept as expressed herein.

We claim:

1. A system for generating an image reproducible inside an optically transparent article comprising:

means for supplying a first image, and an image processing unit responsive to said supplying means for defining said first image by a first plurality of etch points, in which breakdowns in said optically transparent article are to be provided to create the first image inside said optically transparent article, and for transforming said first image into a second image based on optical characteristics of said optically transparent article;

wherein said image processing unit reduces a number of the etch points in said first plurality of etch points so as to maintain predetermined relations between brightness of various portions of said first image.

2. The system of claim 1, wherein said first and second plurality of etch points respectively define three-dimensional representations of said first and second images.

3. A system for generating an image reproducible inside an optically transparent article comprising:

means for supplying a first image, and an image processing unit responsive to said supplying means for defining said first image by a first plurality of etch points, in which breakdowns in said optically transparent article are to be provided to create the first image inside said optically transparent article, and for transforming said first image into a second image based on optical characteristics of said optically transparent article;

wherein said image processing unit determines an optimum number of the etch points required to define said first image based on sizes of the etch points.

4. The system of claim 3, wherein said first and second plurality of etch points respectively define three-dimensional representations of said first and second images.

* * * * *